United States Patent [19]
Madsen et al.

[11] Patent Number: 5,931,285
[45] Date of Patent: Aug. 3, 1999

[54] VIBRATION CONVEYORS

[75] Inventors: Niels Bent Heegaard Madsen, Bjert; Kurt Hesseldahl Christensen, Morud, both of Denmark

[73] Assignee: Poul Johansen Development A/S, Aarup, Denmark

[21] Appl. No.: 08/875,344

[22] PCT Filed: Jan. 29, 1996

[86] PCT No.: PCT/DK96/00049

§ 371 Date: Jul. 25, 1997

§ 102(e) Date: Jul. 25, 1997

[87] PCT Pub. No.: WO96/23248

PCT Pub. Date: Aug. 1, 1996

[30] Foreign Application Priority Data

Jan. 27, 1995 [DK] Denmark ................................ 0098/95

[51] Int. Cl.⁶ .................................................. B65G 27/32
[52] U.S. Cl. .......................................... 198/762; 198/761
[58] Field of Search ................................ 198/759, 761, 198/762

[56] References Cited

U.S. PATENT DOCUMENTS

| | | | |
|---|---|---|---|
| 4,331,263 | 5/1982 | Brown | 198/769 X |
| 4,350,243 | 9/1982 | Weyandt | 198/769 |
| 4,811,835 | 3/1989 | Bullivant et al. | 198/762 |
| 4,921,090 | 5/1990 | Gregor | 198/761 |
| 5,472,079 | 12/1995 | Yagi et al. | 198/762 |

FOREIGN PATENT DOCUMENTS

| | | |
|---|---|---|
| 0 266 835 | 5/1988 | European Pat. Off. . |
| 0 548 812 | 6/1993 | European Pat. Off. . |
| 0 629 568 | 12/1994 | European Pat. Off. . |
| 89 07 748 | 10/1989 | Germany . |
| 75316 | 3/1989 | Japan ............ 198/761 |

*Primary Examiner*—James R. Bidwell
*Attorney, Agent, or Firm*—Sixbey, Friedman, Leedom & Ferguson; David S. Safran

[57] ABSTRACT

A driving system for vibration conveyors of the resonance type has an electromagnetic circuit with an electromagnet with a yoke, with respect to which a running measurement of the current and voltage of the electromagnet is performed, that the electric properties obtained for the electromagnetic circuit as a result of the measurement are used to calculate an instantaneous airgap between the electromagnet and yoke, the value of which is used as a control value for the drive current supplied to the electromagnet, so that an essentially sinusoidal oscillation with a desired amplitude is maintained.

18 Claims, 7 Drawing Sheets

VIBRATION CONVEYORS

BACKGROUND OF THE INVENTION

1. Field of the Invention

The invention relates to a driving system for vibration conveyors of the resonance type comprising an electromagnet with a yoke.

2. Description of Related Art

In order to convey fairly small items, vibration conveyors are frequently used which are either linear or bowl-shaped. A typical example of a vibration conveyor contains a bowl with a spiral track on the inside for the items to be conveyed. The bowl is suspended on slightly slanted leaf springs which in their turn are fastened to a heavy bottom element. Together these parts form a resonant mechanical system. The bottom element is commonly supported by vibration-damped elastomer feet. On the top of the bottom element one or several electromagnets are fastened. If these are connected. to an alternating current, they will induce the bowl to vibration by the varying magnetic attraction of a yoke on the bowl, in step with the frequency of the alternating current. Normally the alternating current supplied will have a fixed frequency, as the source is the public mains. In order to obtain sufficient vibration at this frequency it is necessary to tune the resonant mechanical system to (approximately) the same frequency as that of the supplied force. In the case of a soft iron core and yoke the frequency of the force will be twice that of the mains because of electromagnetic attraction at both positive and negative going currents. The mechanical resonance frequency will, however, vary in function of a number of factors, such as temperature, ageing of the springs, and the mass of the items to be conveyed. Furthermore, the magnetic force supplied will be dependent on variations in the mains voltage. The operator must hence continuously adjust the current supply to the vibration conveyor in order to obtain stable item conveyance. In case a high item velocity is required, it is furthermore necessary to halt operations from time to time in order to retune the resonance frequency.

Furthermore, it turns out in practice that the mechanical resonance frequency depends on the oscillation amplitude, in a such a manner that the the resonance frequency decreases with increasing oscillation amplitude. If the mechanical system is tuned to a higher frequency than the driving frequency, the above relationship will cause a positive feedback of the oscillation with increasing oscillation amplitude, and a negative feedback in the case of decreasing amplitude. The outcome of this is that the vibration conveyor suddenly runs wild when more energy is fed into it, and suddenly halts when the energy supply is reduced. Furthermore, an increase of the mass of the oscillating system by loading it with heavy items will result in a lower resonance frequency, so that this will approach the drive frequency, whereby the oscillation amplitude increases, and the above mentioned phenomenon of positive feedback manifests itself. In order to obtain a stable conveying system it is hence necessary to tune the vibration conveyor resonance frequency such that it is 5–10% lower than the drive frequency which calls fore more energy input to obtain sufficient oscillation or vibration amplitude.

Even though the energy requirement is reduced because of the resonance, there is still, in large conveying plants, a requirement for an overdimensioned electrical installation due to the large reactive current caused by the large airgaps in the electromagnets. This results in either a higher payment to the electricity company or the need for investment in phase compensators. In traditional systems the amplitude of the vibrator oscillation is adjusted by means of a variable mains transformer which has to be individually adjusted for each individually tuned conveyor unit. Alternatively, a power regulation of the phase control type may be used. All these factors are considered as particular disadvantages of the known systems.

In order to partially remedy these disadvantages it has been tried to use a variable frequency to drive vibration conveyors, i.e., to tune the individual driving frequency according to the prevailing mechanical resonances. Simple frequency converters have been used, but better results are obtained by determining the amplitude and frequency of the oscillation itself by means of an accelerometer which provides signals which may be used in closed-loop control of the frequency generators. This, however, entails a complication in installation, and it must be ensured that the cable carrying the accelerometer signal is not subjected to breakage or causes microphony.

From published European Patent Application EP 0 629 568 A2 a construction is known where the vibration conveyor is driven from a voltage source which produces rectangular pulses. The frequency and pulse width of these may be varied so that the effective coil current is varied correspondingly in frequency and amplitude. Hereupon the oscillation amplitude is measured and expressed as the amplitude of the third harmonic in the coil current (in the case of piezoelectric vibrators expressed by means of the second harmonic). It has been established that there is an approximately linear relationship between the content of third harmonic and the oscillation amplitude. The amplitude of the third harmonic is used as feedback in a control loop in order that a given-amplitude may be retained. The resonance frequency is found by means of a sweep of the frequency range and locking of the drive frequency when the content of third harmonic is maximum. Henceforth, the drive frequency is kept constant until a desired oscillation cannot be maintained, even at maximum current. A new sweep is performed, and the frequency is again locked. This means that each time that items are filled into the vibration conveyor, and along with the emptying of the items, a new frequency sweep will be required. This calls for undesired pauses many times per hour.

Another known construction is described in U.S. Pat. No. 4,811,835. This case deals exclusively with a bipolar type, i.e., where the yoke is a permanent magnet. Here, the mechanical oscillation frequency will be equal to the drive frequency. If the drive voltage is sinusoidal, the drive current will have a signal superimposed which is caused by the movement and which will hence have the same frequency as the drive frequency. The phase shift of this signal will follow the phase of the oscillation in such a way that it is shifted −90° with respect to the drive current and far from resonance 0° or 180° with respect to the drive current. At resonance it will hence contribute a phase shift in the total current while far from resonance it will only influence the amplitude of the drive current.

The patent uses this, in that the phase between current and voltage is measured continuously, and the frequency is adjusted so that the phase shift between drive current and drive voltage is minimum (i.e. the phase of the oscillation is −90°). This construction is unable to determine whether the instantaneous drive frequency lies above or below the resonance frequency. Hence, the frequency is adjusted in a given direction, until the phase change since last measurement is positive, i.e., moving away from resonance. The direction is changed, and the sweep is restarted. In order to maintain a constant oscillation amplitude the measured values of current and voltage are used to calculate the power supplied. The amplitude of the drive voltage is adjusted in order that the supplied power is held constant. It is held that the feed velocity of the items has a linear dependency on the supplied power. There is hence no feedback in this control.

A third known construction is described in published European Patent Application EP 0 432 881 A1 which regards a piezoelectrically driven vibrator. The measurement signal is obtained in a similar fashion as above, but the phase is used to calculate the power uptake, and it is this which the control attemps to keep constant. Intervals of amplitude control alternate with intervals of frequency control. Thus, the amplitude is controlled at a fixed frequency so that the power uptake becomes a predetermined value, and during the subsequent frequency control, the target is maximum power uptake. This control method is very slow, and sudden loading with items will cause a long waiting period until a suitable frequency (resonance) has been found.

None of the constructions described is able to brake the oscillation actively. Braking of the oscillation by controlling a drive current in counterphase to the movement can only be attained if the phase of the movement is known continously and can control the braking current phase-locked to the movement.

SUMMARY OF THE INVENTION

In order to avoid the above disadvantages, without complicating the vibration conveyor itself with further sensors, etc., the present invention is based on a principle where the electric properties of the electromagnets themselves are used as a means to detect the movement of the vibrator, and to use this to control the frequency and amplitude of the power supply continuously, in order that the vibration conveyor is driven at resonance and so that a desired amplitude of vibration is maintained.

The method consists in obtaining a precise expression for the movement as it occurs, by mathematical calculations on measured instantaneous values for current and voltage supplied to the electromagnet, expressed as the instantaneous value of the airgap of the electromagnet. Hereby, there is obtained a true representation of the movement over time as a sinusoidal oscillation. The amplitude of this calculated signal is used as a control value for the amplitude of the drive current so that an oscillation with a given amplitude may be maintained. By measuring the phase shift between the supplied power and the calculated signal for the movement and by using this as a control value for the frequency of the drive current, it is a simple matter to obtain the mechanical resonance frequency by means of a simple phase locked loop control. The drive current may hence be controlled as to frequency and amplitude in two independent control loops, so that the mechanical resonance frequency is tracked and a desired oscillation amplitude is maintained.

The invention may hence be realized in a vibration conveyor as defined above in that a running measurement of the current and voltage of the electromagnet is performed, that the electric properties obtained thereby for the electromagnetic circuit is used to calculate the instantaneous airgap, the value of which is used as a control value for the drive current, so that an essentially sinusoidal oscillation with a desired amplitude is maintained.

A minimal power consumption is obtained in an embodiment of the invention which is particular in that the frequency of the drive current is controlled as a function of the phase of the movement expressed by the instantaneous airgap, such that the drive current is phase locked to the eigenresonance of the vibration conveyor, irrespective of the load.

A further advantageous embodiment of the invention is obtained when the calculation of the airgap takes place by in a first step calculating the instantaneous electromotive force (EMF) from the electromagnet as a generator, by subtracting the electric losses in the electromagnet from the instantaneous voltage, which electromotive force is integrated in a second step, whereby in a third step the current divided by said integrated value results in a signal which represents the instantaneous airgap as a function of time.

A particularly advantageous embodiment of the invention is particular in that it comprises means for rectifying and smoothing the mains voltage to a corresponding DC voltage, a power stage for generating a controlled drive current for the electromagnet, units for measurement, filtering, and A/D conversion of current as well as voltage, means for adjusting the amplification, a digital processor for the calculation of the movement of the vibrator expressed as a reference value which is used in controlling an essentially sinusoidal power supply to the electromagnet while controlling the vibration frequency to resonance and a predetermined vibration amplitude.

A further embodiment is particular in that it comprises means for detecting an increase in airgap and/or a reduction in drive frequency without a corresponding change in power consumption and to cause the indication of spring fatigue. In this way, undesired pauses may be avoided as the vibration conveyor may be serviced during a regular service shut-down before the function has deteriorated too much.

A further advantageous embodiment is particular in that a drive current is controlled in such a manner that it is in counterphase to the oscillation and hence can be used to brake it. Due to the high Q factor of the mechanical oscillating system, a vibration conveyor will normally continue its oscillation for a long time after a simple interruption of the supply. This is a traditional disadvantage of systems used for administering items. According to the present embodiment, the energy stored in the system is quickly absorbed, and thus the vibration conveyor is stopped very efficiently.

The invention will be described in greater detail in the following with reference to the accompanying drawings.

DETAILED DESCRIPTION OF THE INVENTION

Figure 1:
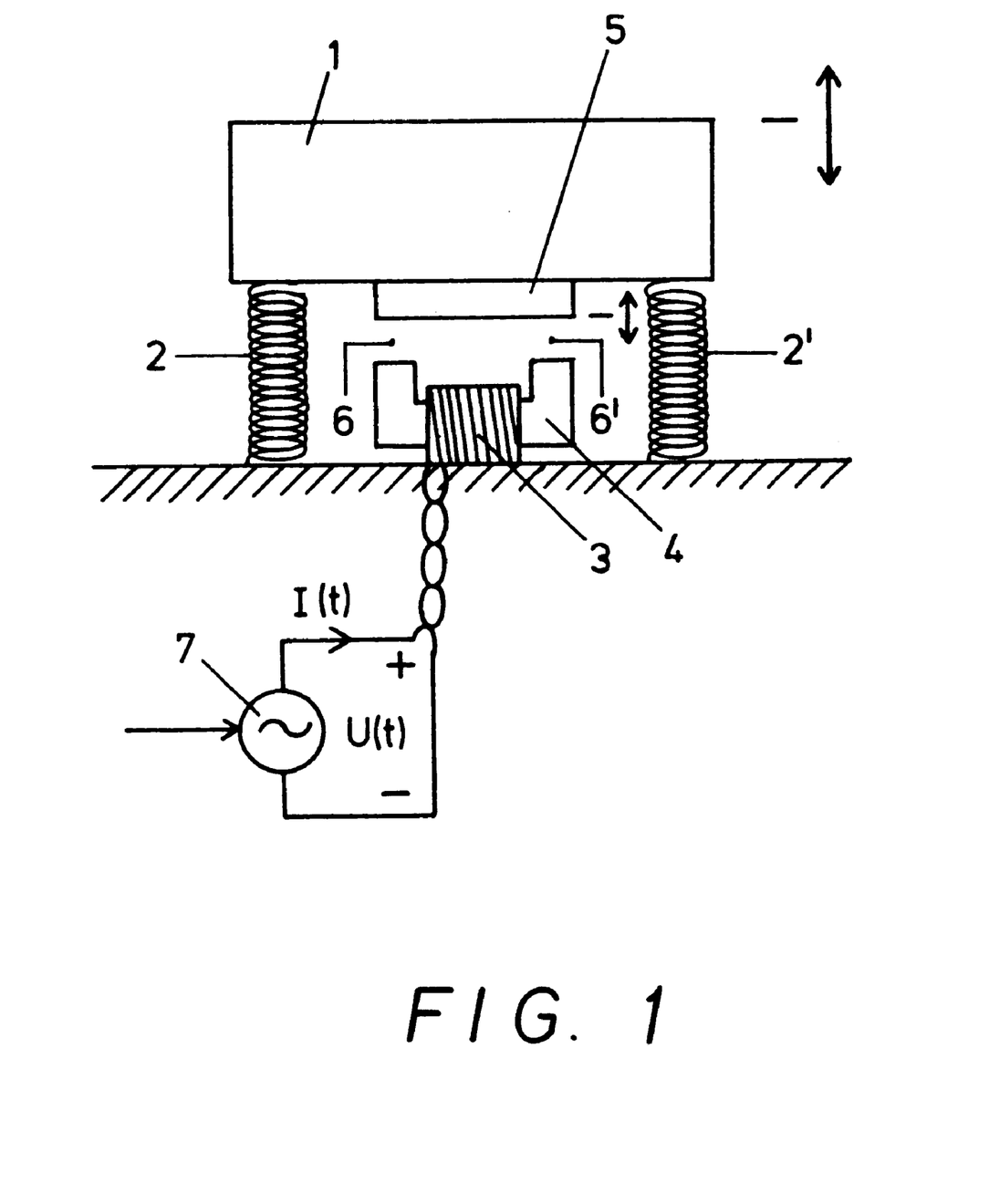
FIG. 1 shows a basic circuit diagram of the basic components in a vibration conveyor.

In FIG. 1, a mass 1 is shown which is carried by springs 2 and 2'. It shows the principle of a vibration conveyor driver, and in practice the actual construction is determined by the type of vibration conveyor. A solenoid 3 together with the core 4, the yoke 5, and the airgaps 6 and 6' constitute an electromagnetic circuit which displays an impedance which is dependent on the total length of the airgaps. A current source 7 which can be controlled, is connected and in conduction with the connections to the solenoid. The current I(t) as well as as the voltage across it U(t) can be measured in dependence of time t. In modern practice the measurements will occur via analogue/digital converters in order that the results of measurements may be submitted to digital signal processing.

The method according to the invention is based on mathematical calculation on measured instantaneous values of current and voltage to the electromagnet, in order to obtain an expression of the instantaneous value of the airgap of the electromagnet. Thus, a temporally correct image is obtained of the movement as a sinusoidal oscillation. The amplitude of this calculated signal is used as a control value for the amplitude of the drive current so that an oscillation with a given amplitude may be maintained.

Figure 2:
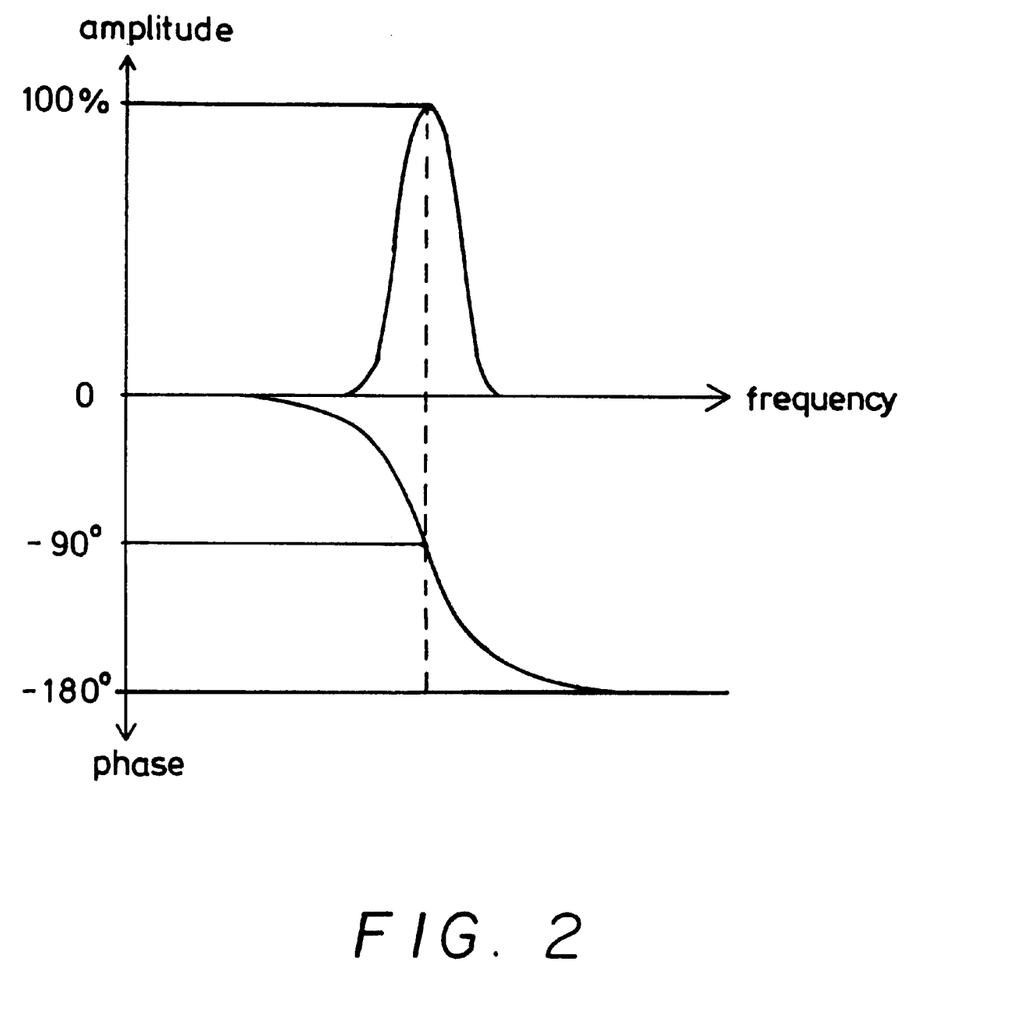
FIG. 2 shows a typical frequency characteristic for a resonant system with a high Q factor.

The phase between movement and supply of power for a mechanical resonant circuit is known to be as shown in FIG. 2. By measuring the phase displacement between the power supply and the calculated signal representing the movement, and using this as a control value for the frequency of the drive current, this may easily be controlled to coincide with the mechanical resonance frequency by means of a simple phase locked loop (PLL) control circuit.

Figure 3:
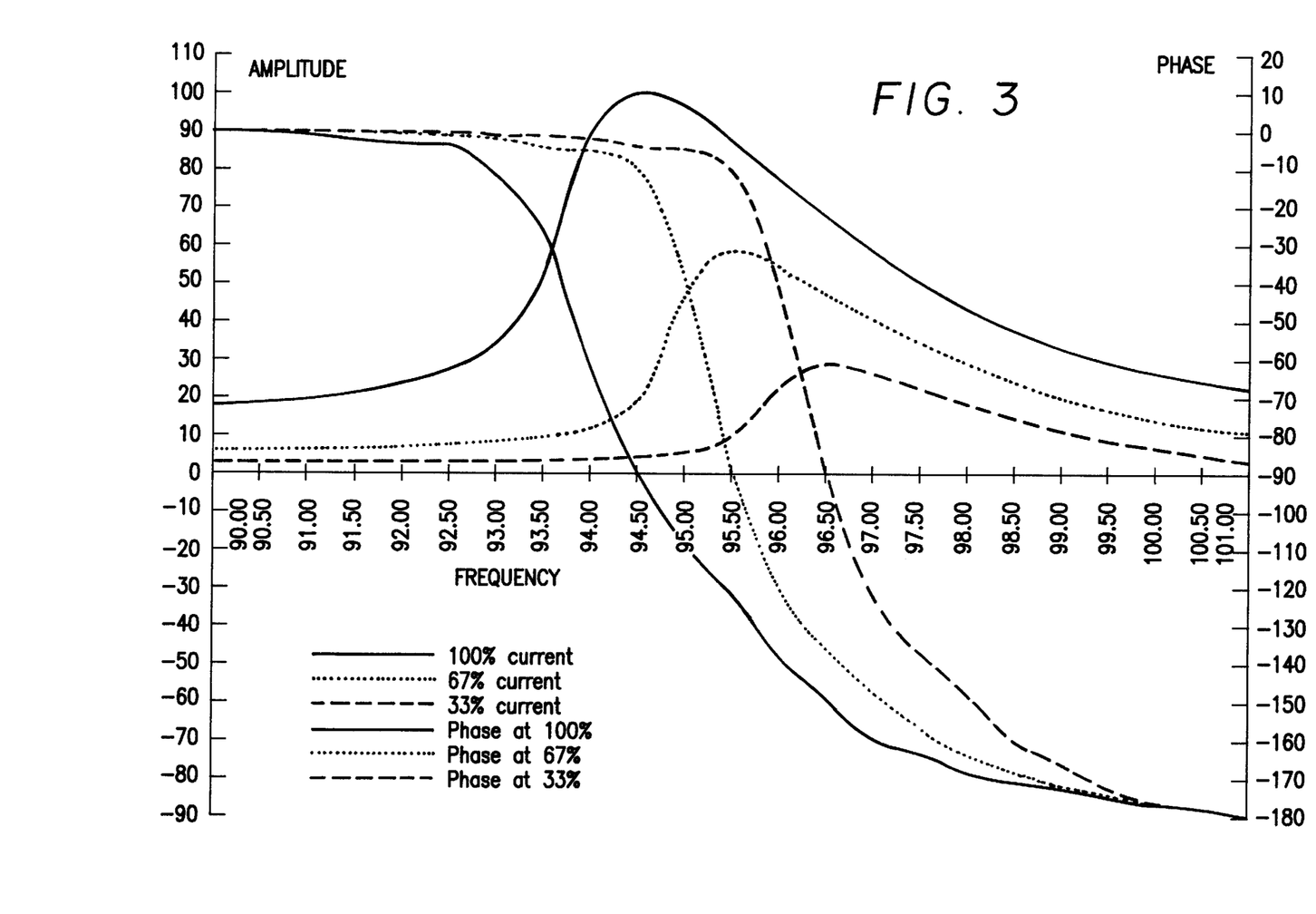
FIG. 3 shows basic resonant curves for a vibration conveyor in amplitude as well as phase at various drive currents.

In FIG. 3 is shown a completely general resonance function for a vibration conveyor, i.e., curves displaying the amplitude and phase of the oscillation when an alternating current with a constant amplitude but varying frequency is fed to it. The phase is considered as the phase of the movement with respect to the phase of the current. The quality factor Q for the oscillating system is the amplitude which is obtained at resonance as compared to the driving amplitude, and it can in the present case be estimated to be about 10 and it is an expression of the small losses present in the system.

In FIG. 3, it is seen that in case-the frequency is controlled such that the phase between the movement and the current supplied is ca. 90°, the resonance peak will be obtained, irrespective of the oscillation amplitude. The drive current may hence be controlled with respect to frequency and amplitude, independently and non-interacting in two control loops so that the mechanical resonance frequency is followed, and a desired oscillation amplitude is maintained. An oscillation with a desired amplitude may thus be maintained with a minimum of energy supply, and independent on the load and resonance frequency.

The method according to the invention utilizes the following theoretical link between the electrical properties for an electromagnet with an airgap and the gap length, the magnetic field being considered homogeneous around the whole magnetic path. The following symbols are used in the development of the expressions:

E(t)=Electromotive force
U(t)=Coil voltage
I(t)=Coil current
G(t)=Magnetic airgap
R=Coil resistance
A=Magnetic area
Φ(t)=Magnetic flux
l=Total magnetic lenght
$l_{fe}$=Magnetic length in core and yoke
$\mu_{fe}$=Effective magnetic permeability
$1_{fe}$=Relative magnetic permeability for core and yoke
$\mu_0$=Vaccuum permeability According to Faraday's law one obtains:

$$E(t)=N*(d\Phi/dt) \tag{1}$$

The standard electromagnetic expression:

$$\Phi(t)=I(t)*(\mu_e*N*A)/l \tag{2}$$

By re-writing (2) relative to vacuum permeability one obtains:

$$\Phi(t)=I(t)*(\mu_0*N*A)/((l_{fe}/\mu_{fe})+G(t)) \tag{3}$$

By inserting into (1) one obtains:

$$E(t)=N*(\mu_0*N*A)*(d/dt)[I(t)/((l_{fe}/\mu_{fe})+G(t))] \tag{4}$$

Integration over time on both sides gives $$\int E(t)=(\mu_0*N^{2}*A)[I(t)/((l_{fe}/\mu_{fe})+G(t))]+k \tag{5}$$

If the integration begins at I(t)=0 => k=0; whereafter $$I(t)/\int E(t)=G(t)/(\mu_0*N^{2}*A)+(l_{fe}/\mu_{fe})/(\mu_0*N^{2}*A) \tag{6}$$

which is a linear function between current divided by integrated electromotive force, and the length of the airgap. The electromotive force is obtained by subtraction of the voltage related to the losses:

$$E(t)=U(t)-R*I(t) \tag{7}$$

whereafter E(t) is integrated, and G(t) is obtained from (6), by insertion of (7)

$$G(t)=(\mu_0*N^{2}*A)*I(t)/(\int(U(t)-R*I(t))+(l_{fe}/\mu_{fe}) \tag{8}$$

It is seen that it is only variations in the value of $\mu_{fe}$ in connection with saturation of the iron which can influence to any degree the linearity in the expression, as all the other parameters are considered to be invariant over time. However, for a medium-sized electromagnet, the value of $(l_{fe}/\mu_{fe})$ is in the order of magnitude of 0.04 mm ($l_{fe}$=200 mm and $\mu_{fe}$=5000), and even a variation of ±50% would only result in an error of ca. ±0.02 mm.

By continuously calculating G(t) from (8) a signal is obtained which describes the oscillation of the vibrator around a constant value which is $G_0+l_{fe}/\mu_{fe}$ i.e., the mean value of the magnetic path recalculated to vacuum. By using the amplitude of this oscillation to control the amplitude of the drive current and by using the phase as the control for the drive frequency, a given oscillation amplitude may be maintained, and the driving frequency may be maintained at the presently occurring resonance frequency. It is important for the stability of the system that both parameters are controlled continuously, as both the resonance frequency and the oscillation amplitude may change very much with varying load. It is in particular important that the frequency control is fast and precise, so that fast changes in the resonance frequency may be followed. Otherwise, the oscillation amplitude cannot be maintained by the amplitude control. The amplitude control must of necessity be fairly slow (GBW=0.5– 5 Hz), as the Q of the resonant circuit causes a very low frequency pole (a large time constant) in the control loop for the amplitude.

It has been determined experimentally that the resonance frequency may fall by as much as 30% and the current requirement rise 400% by loading the vibration conveyor with a heavy load, even if the vibrator is at all times driven at resonance. If, however, a given driving frequency is maintained, e.g., corresponding to resonance in the case of a conveyor with an empty bowl, the resonance frequency with a heavy load will be up to 30% from the drive frequency, and the requirement for extra power input rises astronomically. In FIG. 3, it is shown that a deviation of only 5% gives rise to a current requirement which is three times as large if the oscillation amplitude is to be maintained. This corresponds to 1200% as compared to an empty bowl and driving at resonance.

Even with a constant load the vibrator will only with great difficulty be able to be driven stably, if the drive frequency is fixed at resonance. This is due to a highly nonlinear function between energy supply and oscillation amplitude, because the resonance frequency is also displaced as a function of the oscillation amplitude. The drive frequency will hence not be able to hit the resonant peak at all possible oscillation amplitudes. If in FIG. 3 the drive frequency is taken to be 95.5 Hz, it is seen that at a low or no vibration the resonant point will be above the drive frequency, and very much energy must be used to create an oscillation. When the oscillation eventually grows, the point of resonance will move closer to the drive frequency, and the oscillation will suddenly increase tremendously (positive feedback), until the point of resonance has passed the drive frequency. Subsequently, another large increase in energy is required, because an increased oscillation amplitude will only make the point of resonance to move further away from the drive frequency (negative feedback). The phenomenon is illustrated graphically on FIG. 4. This non-linearity will make it very difficult to control the oscillation amplitude precisely.

Figure 4:
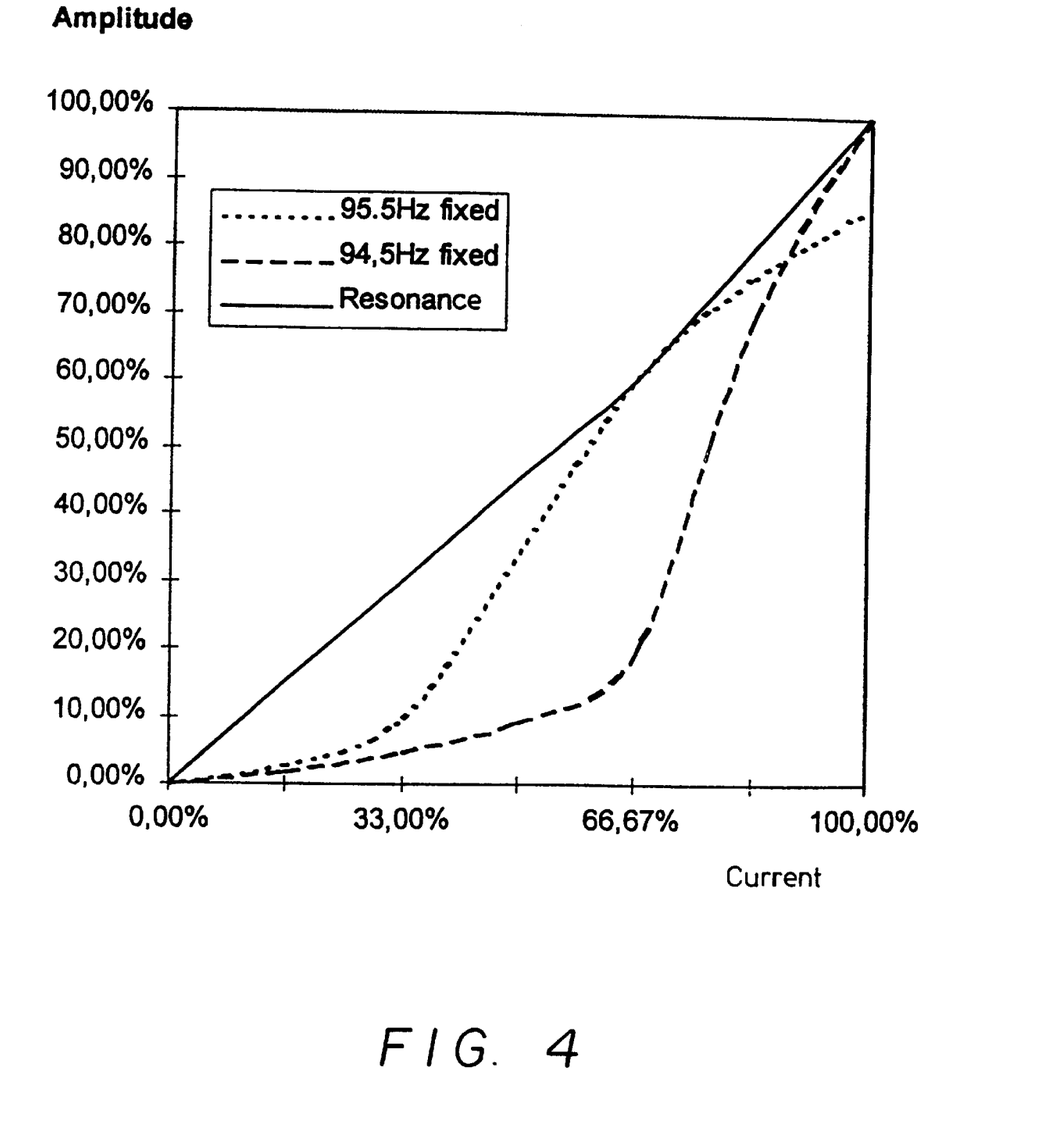
FIG. 4 shows the function linking amplitude and current for the vibration conveyor described in FIG. 3.

In FIG. 4 is shown the connection between the amplitude obtained and the current at various driving conditions.

Figure 5:
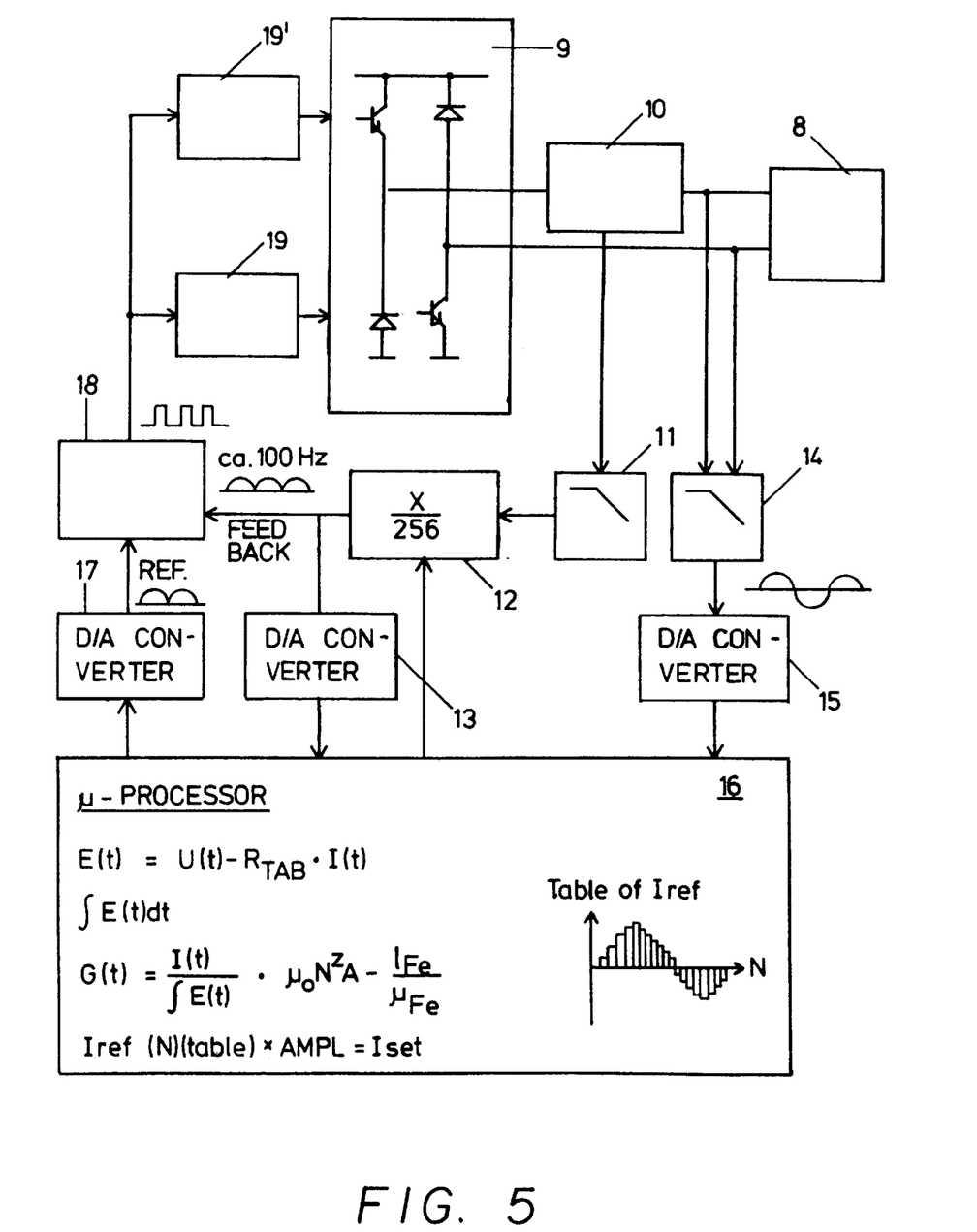
FIG. 5 shows a block diagram of a drive system according to the invention.

In FIG. 5 is seen a block diagram relating to an embodiment of the invention. The electromechanical resonant circuit 8 contains the mass of the vibrator including the yoke, the springs and the solenoid with its iron path and airgap G. The resonant circuit is driven by the power stage 9, and the invention relates to the generation of a correct signal for this purpose. The current taken up by the resonant circuit 8 is measured by means of the unit 10 which may be a shunt resistor, across which the voltage is measured. As digital signal processing is desired, the signal is low pass filtered in the filter 11 before a continuously variable amplification is applied in the unit 12. This unit does not in itself form part of the invention, but it enables that the control circuit may be adjusted to control large as well as small vibrators, without any change in its construction. Subsequently the signal is converted to digital representation in the analog-to-digital converter 13. In a similar fashion the voltage across the terminals of the electromechanical resonant circuit is measuered via a filter 14, and it is converted to digital form in the analog-to-digital converter 15. The signals are utilized in a microprocessor 16 which performs signal processing on them, such that the airgap G as a function G(t) of time, may be expressed by means of the measured voltages U(t) and currents I(t).

The microprocessor 16 also controls the linear amplification in the unit 12 of the current signal in dependence of the physical size of the electromechanical resonant circuit. The purpose of the control is to control the current so that force becomes nearly sinusoidal with a suitable frequency, which in a further embodiment is a frequency which is phase-locked to the current mechanical resonance frequency of the vibration conveyor.

In FIG. 5, the result of the digital signal processing is a digital value which acts as a reference for the control of the current to the resonant circuit 8. In the shown embodiment this value is converted in a digital-to-analog converter 17 to an analog value which in a pulse width modulator 18 is used as a reference, as the analog value of the instantaneous current to the resonant circuit 8. Thereby, a feedback loop has been obtained which will control the airgap G in a desired manner. The output signal from the pulse width modulator is taken to a drive circuit 19, 19' for positive and negative half-waves, respectively, to the power amplifier 9. It will be well-known for the skilled person to adjust the respective loop gains and time constants in order to avoid self-oscillation or saturation in the feedback loop.

Figure 6A:
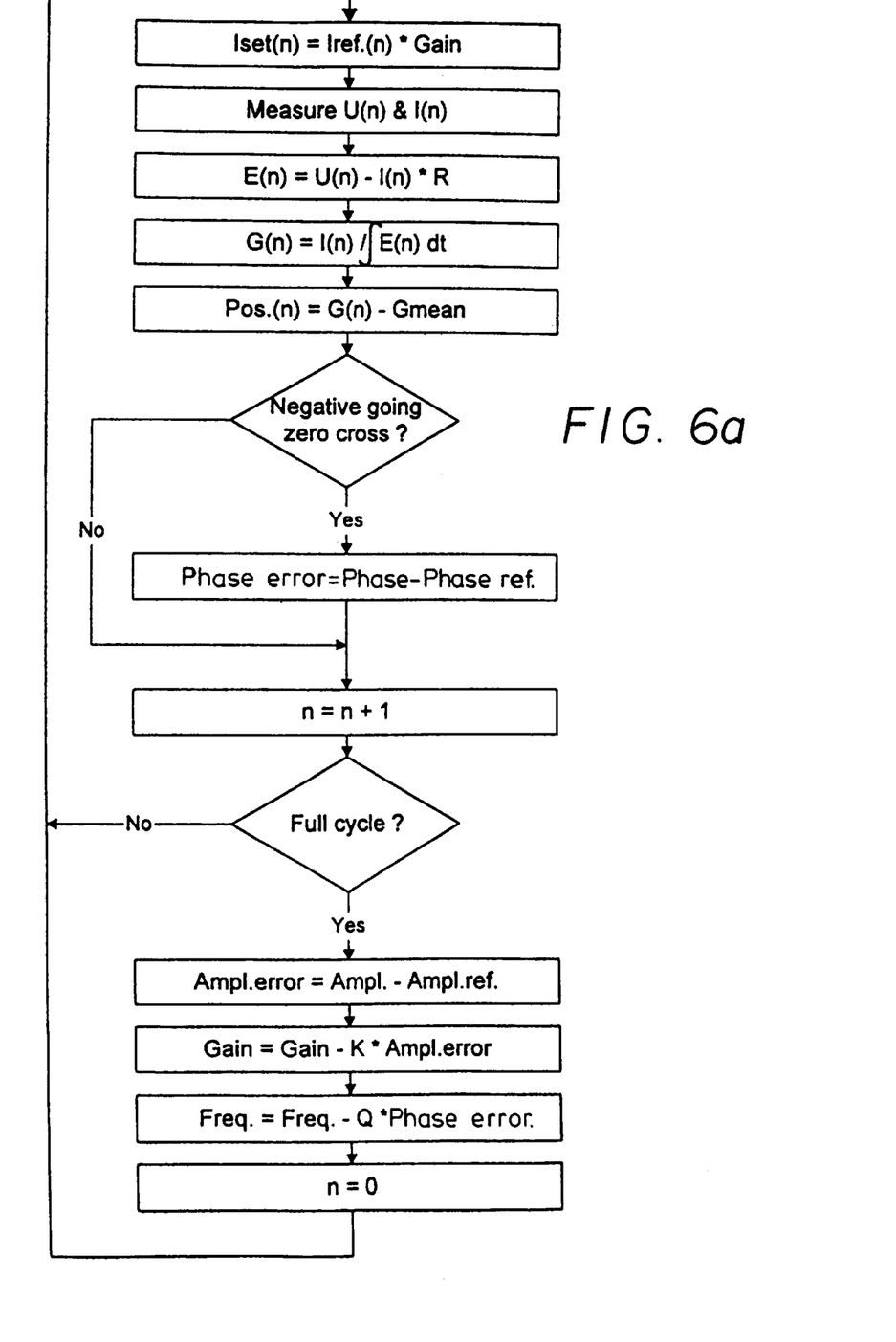
FIG. 6 shows a simplified flow-chart for the data processing that-takes place in conjunction with the embodiment shown in FIG. 5.

In FIG. 6a is shown a simplified flow diagram for the program which is performed by the microprocessor 16 in order to obtain reference signals for the control of the current fed to the resonant circuit 8. The calculation is based on the basic Electromagnetic rules concerning EMF in a coil and the rate of change of flux, and the link between flux current and magnetic path lenght which includes the airgap G. Hereby, the airgap G(t) may be isolated expressed by means of the current I(t) and the integral of the EMF E(t). In practice the electrical resistance of the electromagnet will generate an equivalent voltage drop R×I(t) which when subtracted from the terminal voltage U(t) across the resonant circuit will give its EMF E(t). The following steps in the calculation are performed according to FIG. 6:

1 new set value for the current reference
2 current and voltage are measured
3 the electromotive force E(t) is calculated
4 the airgap of the electromagnet is calculated
5 the deviation of the airgap from the mean value of the airgap is calculated
6 a negative-going zero crossing is checked, and if this is the case, the phase is stored
7,8 the phase-error is calculated and the sample count is noted
8 "complete oscillation period" checked
9 the error in oscillation amplitude is calculated
10 the amplitude factor for the current reference is adjusted in function of the amplitude error
12 the frequency is adjusted in function of the phase error
13 a new cycle is initiated.

Figure 6B:
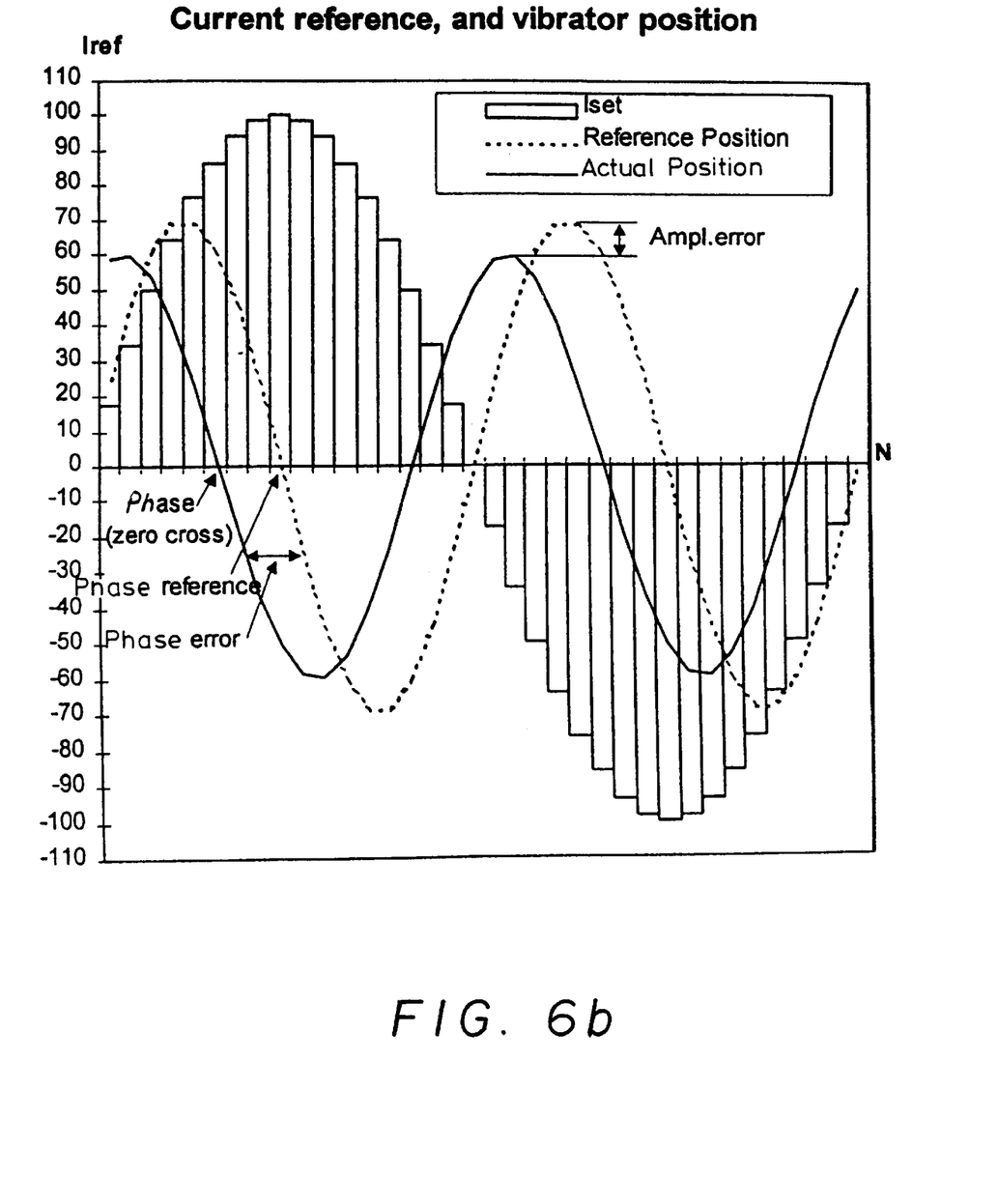

As shown in FIG. 5, the microprocessor 16 contains a table of reference values of the current as a function of the number N, and in FIG. 6b is shown how these values are used in the calculation.

It will be obvious that other steps in calculating and a different order of steps are able to lead to the same results while still making use of the basic idea of the invention.

Apart from the above discussed advantages, a drive system according to the invention has the following particular advantages: the function is stable over time because the vibration conveyors are self-adjusting, and they become insensitive to load variations which may change the amplitude in traditional vibrators. One has greater freedom in the choice of airgap which enables a larger amplitude for a given electromagnet, however a minimum for G must be introduced, corresponding to a very small value of the airgap, without however causing mechanical contact between the yoke and the core. As opposed to e.g., a phase type control of the supplied mains power, the movement will in the present case be sinusoidal which will cause less acoustic noise, as there is no risk of energizing higher harmonics in the conveyor. Furthermore the addition of a simple counter for the items may be used for the active control of the conveyor velocity for the items.

We claim:

1. A driving system for vibration conveyors of the resonance type comprising an electromagnetic circuit having an electromagnet with a yoke, characterized in that a running measurement of current and voltage of the electromagnet is performed, that the electric properties obtained thereby for the electromagnetic circuit are used to calculate an instantaneous airgap between the electromagnet and yoke, the value of which is used as a control value for a drive current supplied to the electromagnet, so that an essentially sinusoidal oscillation with a desired amplitude is maintained.

2. A driving system according to claim 1, characterized in that the frequency of the drive current is controlled as a function of the phase of the movement expressed by the instantaneous airgap, such that the drive current is phase locked to the eigenresonance of the vibration conveyor, irrespective of the load.

3. A driving system according to claim 2, characterized in that calculation of airgap occurs by in a first step calculating the instantaneous electromotive force (EMF) from the electromagnet as a generator, by subtracting the electric losses in the electromagnet from the instantaneous voltage, which electromotive force is integrated in a second step, whereby in a third step the current divided by said integrated value results in a signal which represents the instantaneous airgap as a function of time.

4. A driving system according to claim 3, characterized in that it comprises means for rectifying and smoothing the mains voltage to a corresponding DC voltage, a power stage for generating a controlled drive current for the electromagnet, units for measurement, filtering, and A/D conversion of current as well as voltage, means for adjusting the amplification, a digital processor for a calculation of a movement of a vibrator expressed as a reference value which is used in controlling an essentially sinusoidal power supply to the electromagnet while controlling the vibration frequency to resonance and a predetermined vibration amplitude.

5. A driving system according claim 3, characterized in that it comprises means for detecting an increase in airgap and/or a reduction in drive frequency without a corresponding change in power consumption and to cause an indication of spring fatigue.

6. A driving system according to claim 4, characterized in that a drive current is controlled in such a manner that it is in counterphase to the oscillation in order to brake it.

7. A driving system according to claim 1, characterized in that the calculation of airgap occurs by in a first step calculating instantaneous electromotive force (EMF) from the electromagnet as a generator, by subtracting electric losses in the electromagnet from the instantaneous voltage, which electromotive force is integrated in a second step, whereby in a third step the current divided by said integrated value results in a signal which represents the instantaneous airgap as a function of time.

8. A driving system according to claim 7, characterized in that it comprises means for rectifying and smoothing mains voltage to a corresponding DC voltage, a power stage for generating a controlled drive current for the electromagnet, units for measurement, filtering, and A/D conversion of current as well as voltage, means for adjusting the amplification, a digital processor for a calculation of a movement of a vibrator expressed as a reference value which is used in controlling an essentially sinusoidal power supply to the electromagnet while controlling the vibration frequency to resonance and a predetermined vibration amplitude.

9. A driving system according to claim 8, characterized in that it comprises means for detecting an increase in airgap and/or a reduction in drive frequency without a corresponding change in power consumption and to cause an indication of spring fatigue.

10. A driving system according to claim 7, characterized in that it comprises means for detecting an increase in airgap and/or a reduction in drive frequency without a corresponding change in power consumption and to cause an indication of spring fatigue.

11. A driving system according to claim 4, characterized in that it comprises means for detecting an increase in airgap and/or a reduction in drive frequency without a corresponding change in power consumption and to cause an indication of spring fatigue.

12. A driving system according to claim 2, characterized in that it comprises means for detecting an increase in airgap and/or a reduction in drive frequency without a corresponding change in power consumption and to cause an indication of spring fatigue.

13. A driving system according to claim 1, characterized in that it comprises means for detecting an increase in airgap and/or a reduction in drive frequency without a corresponding change in power consumption and to cause an indication of spring fatigue.

14. A driving system according to claim 13, characterized in that a drive current is controlled in such a manner that it is in counterphase to the oscillation in order to brake it.

15. A driving system according to claim 1, characterized in that a drive current is controlled in such a manner that it is in counterphase to the oscillation in order to brake it.

16. A driving system according to claim 3, characterized in that a drive current is controlled in such a manner that it is in counterphase to the oscillation in order to brake it.

17. A driving system according to claim 2, characterized in that a drive current is controlled in such a manner that it is in counterphase to the oscillation in order to brake it.

18. A driving system according to claim 7, characterized in that a drive current is controlled in such a manner that it is in counterphase to the oscillation in order to brake it.

\* \* \* \* \*